H. M. LAKE.
DRAFT DEVICE.
APPLICATION FILED OCT. 16, 1920.

1,404,867. Patented Jan. 31, 1922.

Inventor
Harold M. Lake
By Lacey & Lacey, Attorneys

UNITED STATES PATENT OFFICE.

HAROLD M. LAKE, OF GETTYSBURG, SOUTH DAKOTA.

DRAFT DEVICE.

1,404,867. Specification of Letters Patent. Patented Jan. 31, 1922.

Application filed October 16, 1920. Serial No. 417,314.

*To all whom it may concern:*

Be it known that I, HAROLD M. LAKE, a citizen of the United States, residing at Gettysburg, in the county of Potter and State of South Dakota, have invented certain new and useful Improvements in Draft Devices, of which the following is a specification.

This invention has for its object the provision of a simple and inexpensive draft device whereby a plow may be coupled to a tractor or to draft animals and under normal conditions will be positively drawn over a field, but which, upon encountering a large stone or other obstacle, will be automatically released from the pulling instrumentality so that injury to the plow or other implement will be avoided. One embodiment of the invention is illustrated in the accompanying drawings and the invention consists in certain novel features which will be first fully described and then particularly pointed out in the claims.

Figure 1:
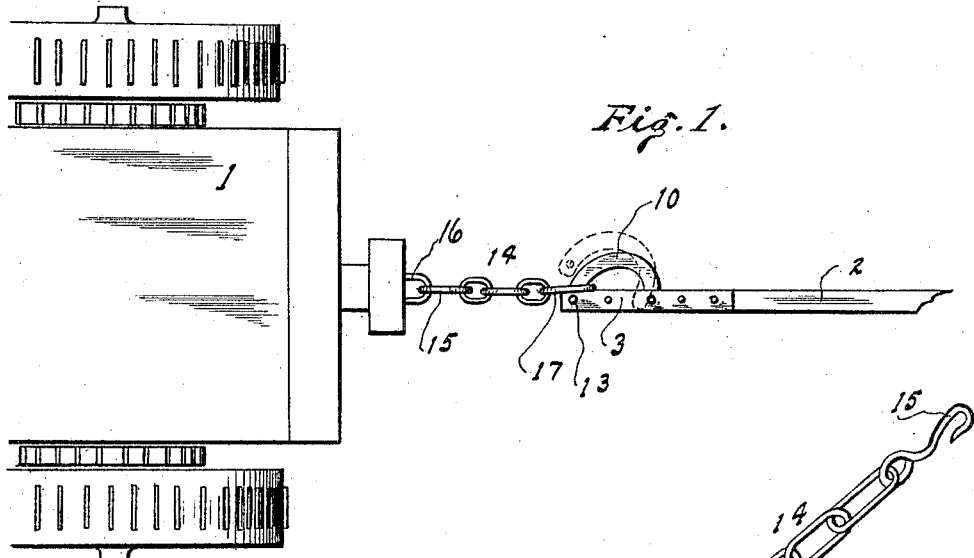
Figure 1 is a plan view of my improved draft device in its operative position.
Figure 2:
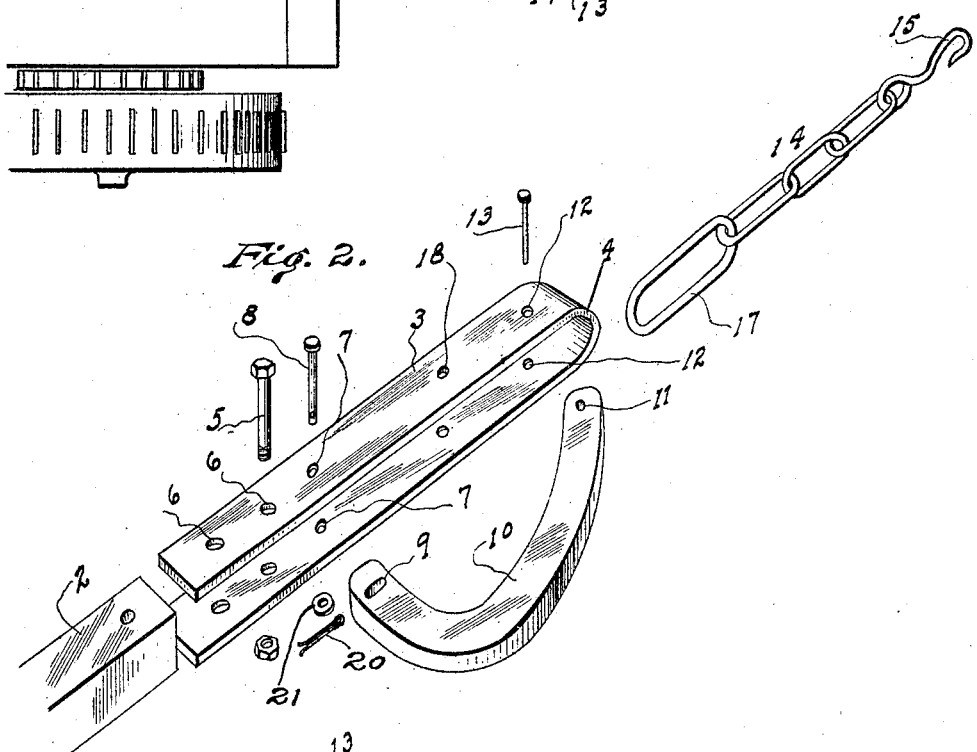
Fig. 2 is an enlarged view of the several parts of the draft device disassembled but approximately in their proper relative positions.

In the drawings, the reference numeral 1 indicates a portion of a tractor and 2 the beam of a plow which is to be drawn over a field to form a furrow. In carrying out my invention, I secure to the front end of the plow beam a clevis 3 consisting of a length of strap iron doubled upon itself to present parallel upper and lower arms connected at their forward ends by a bend 4 but separated at their rear ends. The branches of the clevis are disposed relatively above and below the plow beam and are secured thereto by bolts, such as is indicated at 5, inserted through openings 6 in the members of the clevis and through corresponding openings in the plow beam. In advance of the openings 6, the clevis is provided with an opening 7 through which is inserted a retaining pin 8 which is also adapted to pass through a slot 9 in one end of an angle lever or draft hook 10, being retained in place by a cotter pin 20, or its equivalent, disposed below a washer 21 fitted around the pin below the clevis. This lever 10 is of arcuate form and is disposed laterally with respect to the clevis with both its extremities between the branches of the clevis. The forward end of the lever is provided with an opening 11 therethrough adapted to register with corresponding openings 12 in the clevis near the front end thereof and a frangible pin 13 is inserted through the said openings 12 and 11 after they have been brought into alinement to retain the lever in its operative position. I also employ a short chain 14 which is equipped at one end with a draft hook 15 adapted to engage a coupling member 16 on the rear end of the tractor while the link 17 at the opposite end of the chain is adapted to fit around the forward end of the lever 10 and thereby complete the coupling of the plow or other implement with the tractor.

The operation of the device will, it is thought, be readily understood. After the clevis has been secured rigidly to the front end of the plow beam or to the other implement or vehicle which is to be hauled, the rear end of the lever 10 is inserted between the parts of the clevis and the pin 8 inserted through the openings 7 in the clevis and through the slot 9 in the lever. This pin 8, it will be noted, is provided with a head which is adapted to rest upon the clevis at the sides of the slot and thereby prevent the pin dropping through the slot, but the end of the lever may be shifted longitudinally of the clevis so as to facilitate the fastening of the lever in its operative position and also insure the proper release of the lever when an obstruction is struck. The pin 13 may conveniently be a small nail and it should be of such dimensions and of such material that while it will positively hold the end of the lever under normal conditions it will be readily broken or sheared off under the abnormal conditions to meet which the invention is designed. After the rear end of the lever has been secured by the pin 8, the link 17 of the draft chain 14 is engaged over or around the forward end of the lever and said end of the lever is then inserted between the upper and lower branches of the clevis so that the opening 11 therein will be brought into alinement with the openings 12 in the clevis. The pin 13 is then inserted and the device is ready for use when the draft hook 15 has been engaged in the coupling member on the tractor. The draft is applied by the chain to the front end of the lever and through the lever to the forward pin 13. The pin 13 serves as a medium to transmit the draft to the clevis which in turn applies it to the beam 2 so that the implement will be drawn forward by the tractor. Should the plow share or other working member strike a large stone or root or other large obstruction which will not yield to the implement, the retarding pull exerted upon the implement by the obstruction will cause the clevis to pull relatively rearward and consequently a shearing action will take place between the clevis and the front end of the draft lever to cut through or break the pin 13, whereupon the forward pull exerted by the draft chain will cause the draft lever to swing out to the dotted line position shown in Fig. 1, and release the chain as is obvious. The slot 8 will permit the hook to slide relatively forward when an obstruction is encountered so that the shearing action between the draft lever and the front end of the clevis upon the pin 13 will be positive and follow at once upon the striking of the obstruction so that the draft will be immediately and effectually released and all damage to the parts will be avoided. The device is exceedingly simple and inexpensive and may be readily applied in a few minutes time without the employment of skilled labor.

Figure 3:
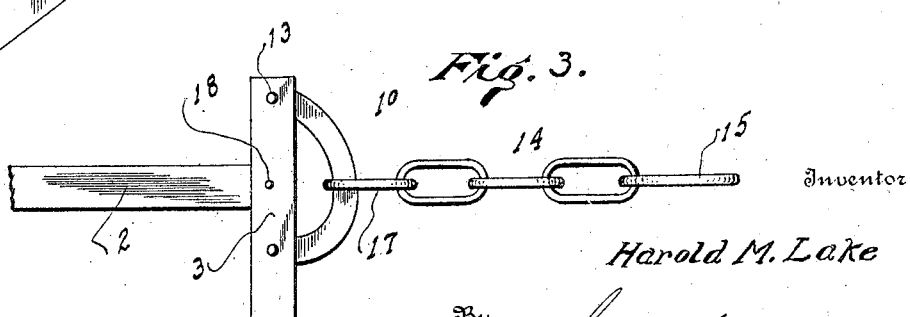
Fig. 3 is a plan view showing a slightly different arrangement of the draft device.

It will be noted, upon reference to the drawing, that openings 18 are provided between the openings 7 and 12 in the clevis and these openings will permit the clevis to be disposed transversely of the plow beam, as shown in Fig. 3, in which arrangement the draft lever is also transverse to the beam but in front of the same and the draft chain instead of pulling upon one end of the lever will exert its pull at the center of the same and across it so that a heavier implement may be drawn without requiring a heavier and separate draft device. The operation is the same except that when the pin 13 is severed the lever will swing forwardly instead of laterally.

Having thus described the invention, what is claimed as new is:

1. A draft device comprising an open-sided clevis rigidly secured to the vehicle to be hauled, an angle lever having its ends disposed between the members of the clevis and its intermediate portion extending laterally from the clevis, the lever having a slot at one end and an open space being defined by the side of the clevis and the angle of the lever, a pin inserted through the clevis adjacent to its rear end and through the slot in the one end of the lever, a frangible fastening inserted through and connecting the other end of the lever to the clevis, and a pulling device having one end engaged around the last-mentioned end of the lever and passed through the space between the clevis and the angle of the lever and its other end constructed to be engaged with a hauling instrumentality.

2. A draft device for implements comprising a clevis rigidly secured at its open end to the draft beam of an implement so as to leave a transverse opening in the clevis, between the forward end of the beam and the closed end of the clevis, a draft hook fitting with both its extremities in said transverse opening, the main portion of said hook projecting beyond the side of the clevis thus providing a space enclosed by the clevis and the hook, frangible means rigidly securing the forward end of said hook to said clevis and other means securing the rear end of the hook to the clevis, said other means permitting movement of said hook in longitudinal direction of said beam, and coupling means engaging around the forward end of the hook and adapted to connect the same with the tractor.

In testimony whereof I affix my signature.

HAROLD M. LAKE. [L. S.]